US 9,680,368 B2

(12) United States Patent
Abe et al.

(10) Patent No.: US 9,680,368 B2
(45) Date of Patent: Jun. 13, 2017

(54) POWER CONVERTER INSTALLED BETWEEN AN ELECTRIC POWER SYSTEM AND AN ENERGY STORAGE DEVICE

(71) Applicant: Hitachi, Ltd., Tokyo (JP)

(72) Inventors: Yusuke Abe, Tokyo (JP); Tomomichi Ito, Tokyo (JP); Masahiro Taniguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 91 days.

(21) Appl. No.: 14/722,199

(22) Filed: May 27, 2015

(65) Prior Publication Data

US 2015/0365010 A1 Dec. 17, 2015

(30) Foreign Application Priority Data

Jun. 12, 2014 (JP) ................................. 2014-121033

(51) Int. Cl.
*H02M 1/36* (2007.01)
*H02J 3/32* (2006.01)
(Continued)

(52) U.S. Cl.
CPC .................. *H02M 1/36* (2013.01); *H02J 3/32* (2013.01); *H02J 7/345* (2013.01); *H02M 7/06* (2013.01); *H02M 7/797* (2013.01)

(58) Field of Classification Search
CPC .................. H02M 1/36; H02M 1/126; H02M 2001/346–2001/348; H02M 5/293; H02M 7/42–7/48; H02J 7/0063–2007/0067
See application file for complete search history.

(56) References Cited

U.S. PATENT DOCUMENTS

| 7,898,103 B2 * | 3/2011 | Oyobe | B60K 6/365 |
| | | | 307/10.1 |
| 2010/0261048 A1 * | 10/2010 | Kim | H01M 10/44 |
| | | | 429/150 |

(Continued)

FOREIGN PATENT DOCUMENTS

JP 08-126339 A 5/1996

OTHER PUBLICATIONS

Zhenxiong Wang, Hao Yi, Zhigang Zhang, Fang Zhuo and Zhirong Zeng, "Implementation of virtual synchronous generator with an Improved Hardware Structure in PV-based microgrids," 2016 IEEE 8th International Power Electronics and Motion Control Conference (IPEMC-ECCE Asia), Hefei, 2016, pp. 3157-3162.*

*Primary Examiner* — Harry Behm
*Assistant Examiner* — Peter Novak
(74) *Attorney, Agent, or Firm* — Mattingly & Malur, PC (57) ABSTRACT

A power converter with a simple configuration capable of controlling a rush current is provided. The power converter is installed between an electric power system and a power storage device, includes a harmonic filter in an AC circuit on the electric power system side and a DC capacitor and a DC breaker in a DC circuit on the power storage device side, and performs AC/DC conversion processing using an inverter. The power converter is configured in such a way that, when the power storage device starts running, a current limited by a limiting resistor is given from the electric power system side to the DC capacitor, the difference between the voltage of the DC capacitor and the voltage of the power storage device is monitored, and the power converter is connected to the power storage device by switching on the DC breaker on the basis of the difference.

14 Claims, 9 Drawing Sheets

(51) Int. Cl.
  *H02M 7/06* (2006.01)
  *H02M 7/797* (2006.01)
  *H02J 7/34* (2006.01)

(56) References Cited

U.S. PATENT DOCUMENTS

2010/0276998 A1* 11/2010 Luo .......................... H02J 3/32
  307/46
2016/0152151 A1* 6/2016 Yang .................. B60L 11/1812
  320/109

* cited by examiner

POWER CONVERTER INSTALLED BETWEEN AN ELECTRIC POWER SYSTEM AND AN ENERGY STORAGE DEVICE

CLAIM OF PRIORITY

The present application claims priority from Japanese application serial no. 2014-121033, filed on Jun. 12, 2014, the content of which is hereby incorporated by reference into this application.

FIELD OF THE INVENTION

The present invention relates to a power converter that is interconnected between an electric power system and a storage battery and performs AC-DC conversion, and more particularly relates to a power converter that includes a capacitor as a part of the power converter itself and an appropriate function for initially charging the capacitor.

BACKGROUND OF THE INVENTION

In recent years, distributed power sources utilizing natural energies and power storage systems including power storage means represented by a storage battery have been widely introduced. These distributed power sources and power storage systems internally include power storage devices and store electric power in the form of DC power. Electric power stored in a power storage device is converted into AC electric power having an interconnected power system frequency by a self commutated power converter, and sent out to the electric power system. In addition, power supplied by the electric power system is converted into DC electric power by the self commutated power converter, and stored in the power storage device.

A self commutated power converter includes an inverter that performs AC/DC conversion and a DC circuit, and the DC circuit includes a capacitor. Furthermore, a DC breaker is disposed between a distributed power source or a power storage system and the self commutated power converter, and while the self commutated power converter is in a halt state, the DC breaker is opened.

When the DC breaker is switched on and the distributed power source and the power storage system are connected to the self commutated power converter at the time when the self commutated power converter starts running, an excessive rush current is induced in the capacitor of the DC circuit, which could lead to the damages to these devices. This rush current arises owing to the potential difference between the voltage of the inverter side of the capacitor and the voltage of the distributed power source or the voltage of the power storage device of the power storage system, and the larger the potential difference between both terminals is, the larger the rush current is.

As one of measures against the above problem owing to the initial charging of the capacitor, Japanese Unexamined Patent Application Publication No. Hei8(1996)-126339 discloses a technique in which a switch and an electromagnetic switch having a resistor, both of which are connected in series, are disposed between a distributed power source or a power storage system and a self commutated power converter. The switch is switched on at the time when the self commutated power converter starts running, and the distributed power source or the power storage system is connected to the self commutated power converter via the resistor, and subsequently the electromagnetic switch having the resistor are switched on. Therefore, when the switch is switched on, a current limited by the resistor flows through the capacitor, which decreases the potential difference between both terminals, with the result that an excessive rush current can be prevented from occurring.

According to Japanese Unexamined Patent Application Publication No. Hei8 (1996)-126339, although it is possible to decrease the potential difference between both terminals using a limiting resistor, it is necessary to install a switch and an electromagnetic switch having a resistor, therefore there arises a problem in that the number of necessary parts are increased, and the power converter grows larger and more complex.

SUMMARY OF THE INVENTION

The present invention was achieved with the above-mentioned problem in mind, and one of the objects of the present invention is to provide a power converter with a simple configuration that is capable of controlling a rush current.

In order to solve the above problem, a power converter according to the present invention is installed between an electric power system and a power storage device, includes a harmonic filter in an AC circuit on the electric power system side and a DC capacitor and a DC breaker in a DC circuit on the power storage device side, and performs AC/DC conversion using an inverter. In addition, the power converter is configured in such a way that, when the power storage device starts running, a current limited by a limiting resistor is given from the electric power system side to the DC capacitor, the inverter is controlled so that the difference between the voltage of the DC capacitor and the voltage of the power storage device decreases after the starting of inverter's switching, the difference between the voltage of the DC capacitor and the voltage of the power storage device is monitored, and the power converter is connected to the power storage device by switching on the DC breaker on the basis of the monitored difference.

In the power converter according to the present invention, because the above limited current is applied to the DC capacitor, the difference between the voltage of the capacitor and the voltage of the power storage device is monitored, and the power converter is connected to the power storage device on the basis of the monitored difference, a rush current, which could occur in the start process from the time when the DC capacitor is initially charged and to the time when the power converter is connected to the power storage device, can be prevented from occurring. In particular, it is possible to control the rush current using the simple configuration of the power converter.

DETAILED DESCRIPTION OF THE PREFERRED EMBODIMENTS

Embodiments of the present invention will be described in detail with reference to the accompanying drawings hereinafter.

First Embodiment

Figure 1:
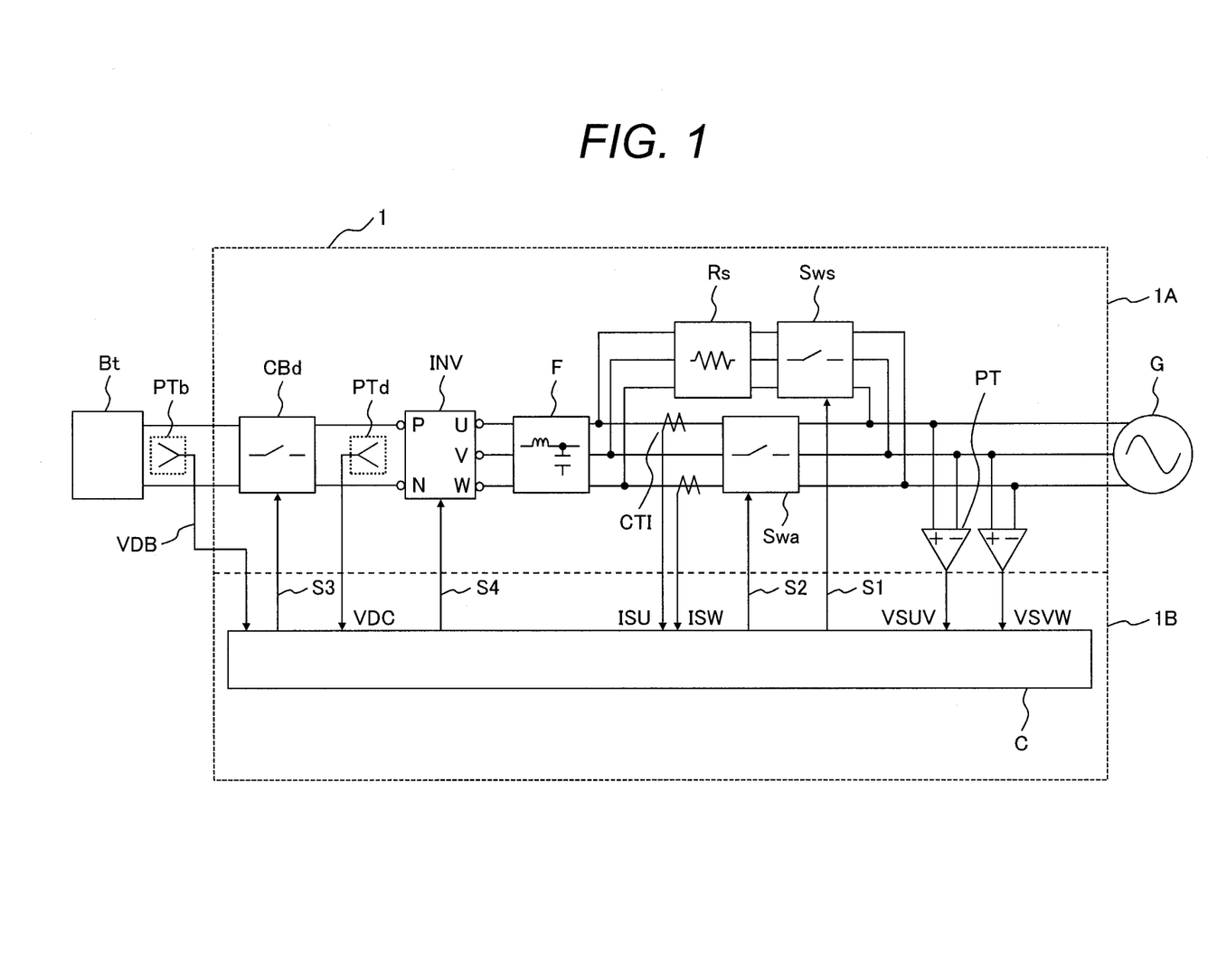
FIG. 1 is a diagram showing the outline configuration of a power converter according to a first embodiment of the present invention.

FIG. 1 is a diagram showing the outline configuration of a power converter according to a first embodiment of the present invention. FIG. 1 shows an AC electric power system G and a power storage device Bt that is included in a distributed power source or a power storage system. The power converter 1 is shown by being surrounded with a dashed line, and it includes a main circuit section 1A and a control unit 1B. The main circuit section 1A may be referred to as a power converter in some cases.

The main circuit section 1A includes an inverter INV as a main component, and AC/DC conversion and frequency conversion are performed in this main circuit section 1A. A DC circuit is formed on the power storage device Bt side of the inverter INV, and the DC circuit includes a DC breaker CBd. The DC breaker CBd is switched on when it is judged that charging a DC capacitor inside the inverter INV is completed, wherein the inverter INV in FIG. 2 will be described later.

An AC circuit is formed on the electric power system G side of the inverter INV, and the AC circuit includes a harmonic filter F for smoothing. The harmonic filter F is used for decreasing the amount of a harmonic current that flows out from the inverter INV to the electric power system G. Furthermore, the AC circuit includes an AC switch Swa and a series circuit composed of an initial charging resistor Rs and an initial charging switch Sws, wherein the series circuit is connected to the AC switch Swa in parallel. The initial charging resistor Rs is used for preventing an excessive rush current from flowing into a filter capacitor FC included in the harmonic filter F and the DC capacitor CD in the inverter INV when the filter capacitor FC and the DC capacitor CD are initially charged, wherein the filter capacitor FC and the DC capacitor CD will be shown later in FIG. 2. In addition, the initial charging switch Sws is used in order for the above capacitors to be initially charged with currents flowing through the initial charging resistor Rs when the power converter starts running.

A controller C in the control unit 1B takes in current signals and voltage signals from various places of the main circuit section 1A in order to give control signals to various places of the main circuit section 1A. These are interconnection point voltages (a line voltage VSUV, a line voltage VSVW) taken in from voltage detectors PT on the electric power system G side, inverter output currents ISU and ISW taken in from inverter output current detectors CTI, a DC voltage VDC taken in from a DC voltage detector PTd installed in the DC circuit, a storage battery voltage VDB taken in from a battery voltage detector PTb, and the like.

Furthermore, the controller C in the control unit 1B gives the control signals S to various places of the main circuit section 1A as results of judgment and calculation processing using the above input. These are an ON/OFF command S1 to the initial charging switch Sws, an ON/OFF command S2 to the AC switch Swa, an ON/OFF command S3 to the DC breaker CBd, and a gate signal S4 to the inverter INV, and the like.

Figure 2:
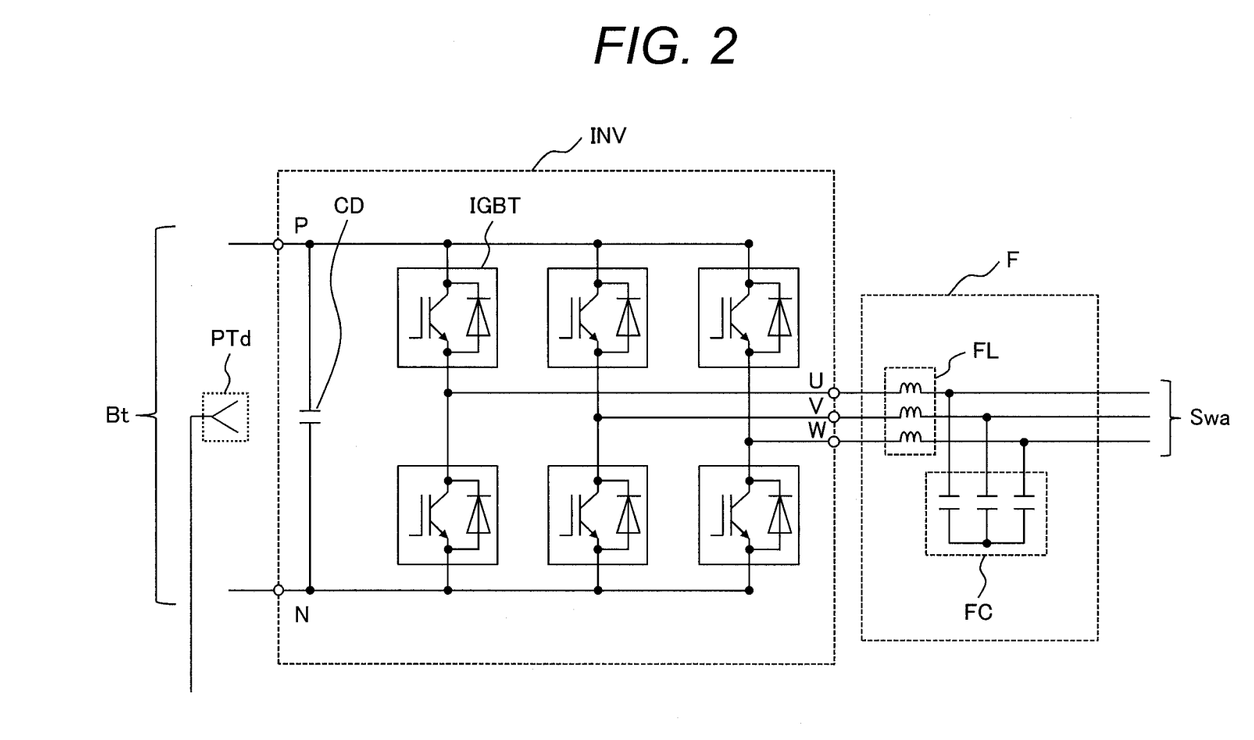
FIG. 2 is a diagram showing an example of an inverter and an example of a harmonic filter both of which are adaptable to the first embodiment.

FIG. 2 is a diagram showing an example of the inverter INV and an example of the harmonic filter F both of which are adaptable to the first embodiment. The harmonic filter F of these two components includes a filter reactor FL that is a three-phase reactor, and the filter capacitor FC that is a three-phase capacitor, and the harmonic filter prevents a harmonic current, which is generated in the inverter INV, from flowing out to the electric power system G. Here, the filter capacitor FC is initially charged with an AC current flowing through the initial charging resistor Rs.

The inverter INV, which is adaptable to the first embodiment, includes the DC capacitor CD and six IGBT modules IGBT. The inverter INV outputs a three-phase AC voltage, and two IGBT modules IGBT connected in series provide a circuit for one phase component of the three-phase AC voltage. The DC capacitor CD is provided on the DC side of the inverter INV, and a voltage across the capacitor CD is an inverter DC voltage. An IGBT module IGBT is a module including an IGBT and a diode both of which are connected in antiparallel to each other.

In the configuration shown in FIG. 2, the voltage across the DC capacitor CD is the inverter DC voltage. The DC capacitor CD is initially charged with a current flowing through the initial charging resistor Rs, the filter reactor FL, and diodes included in the IGBT modules IGBT. After the inverter INV starts running, the DC capacitor CD is charged by the AC power G in accordance with voltage control performed on the basis of the calculation by the controller C until the difference between the storage battery voltage VDB and the voltage across the DC capacitor CD becomes a predefined value. The IGBT modules IGBT are off before the AC switch Swa is switched on, and the inverter INV switches on and off in accordance with reception of the gate signal S4 transmitted from the controller C. After the AC switch SWa is turned on, the inverter INV is controlled by the gate signal S4 that is output from the controller C in such a way that the DC voltage VDC falls within a predefined range, and the IGBT modules IGBT become in an operating state.

Figure 3:
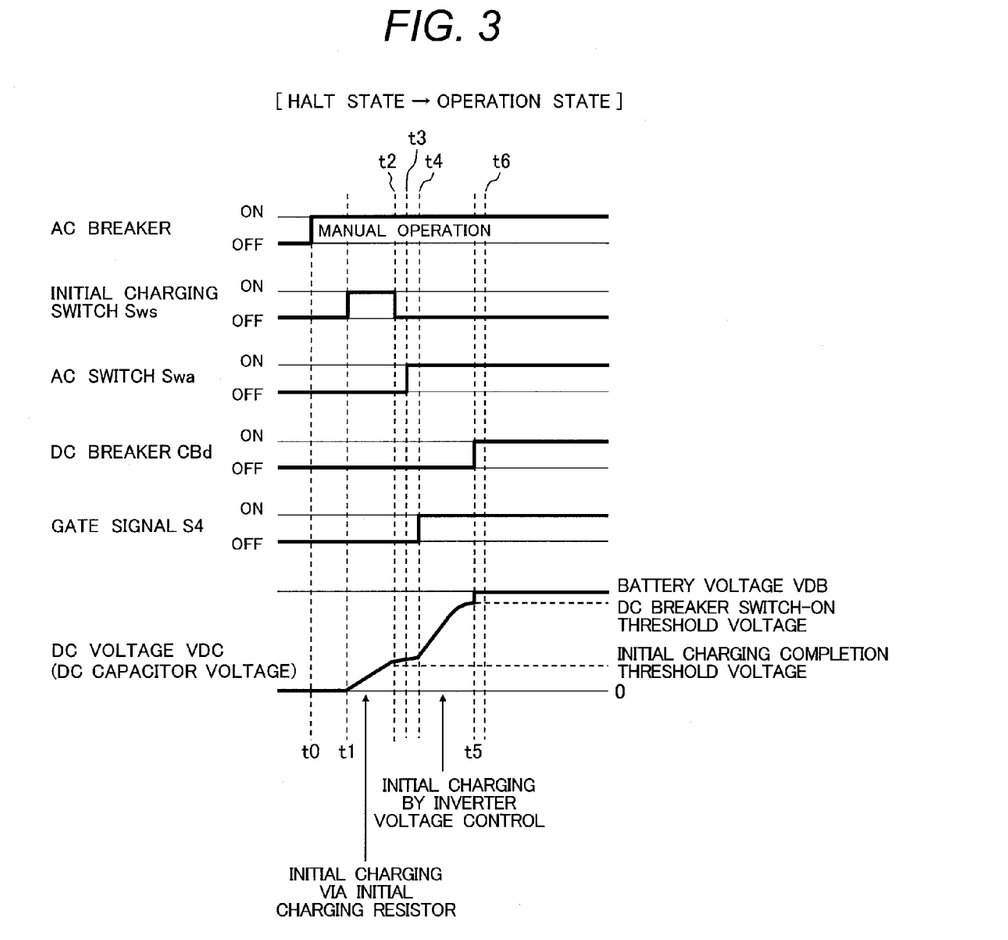
FIG. 3 is a diagram showing a timing chart during the start time period of the power converter.

FIG. 3 shows a timing chart during the start time period of the power converter according to the first embodiment of the present invention shown in FIG. 1 and FIG. 2. This timing chart shows the operational sequence of switching means such as breakers and switches, the start timing of the converter during a time period from the halt state to the initial charging, and the DC voltage VDC across the DC capacitor CD obtained through the above operational sequence.

In the start sequence of the present invention, an AC breaker (not shown) is switched on manually at the time t0 first. Here, the AC breaker is disposed on the electric power system side of the main circuit section 1A. In addition, at the time t0, the switching means such as the AC switch Swa, the initial charging switch Sws, and the DC breaker CBd are in their open states respectively, and the gate signal S4 has not been applied to the inverter INV yet.

Initial charging during the start time period of the power converter is started by switching on the initial charging switch Sws at the time t1. As a result, a circuit route from the initial charging switch Sws to the DC capacitor CD via the initial charging resistor Rs, the harmonic filter F for smoothing, and the IGBTs (the antiparallel diodes) inside the inverter INV is formed, and the DC voltage VDC across the DC capacitor CD gradually increases owing to the current limited by the initial charging resistor Rs.

The initial charging switch Sws is opened at the time t2 when the DC voltage VDC reaches an initial charging completion threshold voltage. Subsequently, the AC switch Swa is switched on instead at the time t3 just after the time t2. As a result, a circuit route from the AC switch Swa to the DC capacitor CD via the harmonic filter F for smoothing and IGBTs inside the inverter INV is successively formed. Furthermore, at the time t4 just after the time t3, the gate signal S4 begins to be applied to the inverter INV. During the time period of this series of changing-over operations, the DC voltage VDC across the DC capacitor CD slightly increases.

With regard to the sequence operation after the time t4, a means for preventing an excessive current at the time of switching on the DC breaker from occurring, which is a novel aspect of the present invention, will be described. After the time t4, the DC voltage VDC across the DC capacitor CD is controlled by the gate signal S4 input into the inverter INV. In inverter control at this time, the voltage of the storage battery Bt (storage battery voltage VDB) is measured, and the voltage control is performed with a switch-on threshold voltage of the DC breaker CBd, which is set to be a little lower than the storage battery voltage VDB, used as a target. To put it concretely, the voltage control is performed with a DC voltage command value set as the storage battery voltage VDB. This control is continued during the time period from the time t4 to the time t5 when the DC voltage VDC reaches the switch-on threshold voltage of the DC breaker CBd, and when the DC voltage VDC reaches the switch-on threshold voltage, the DC breaker CBd is switched on. As a result, the difference between the DC voltage VDC of the DC capacitor CD and the storage battery voltage VDB becomes a very little, which prevents an excessive current owing to the switching-on of the DC breaker CBd from occurring. At the time t6 after the DC breaker CBd is switched on, the control by the inverter INV is performed so that the electric power system G freely accommodates the power storage device with electric power and vice versa.

Figure 4:
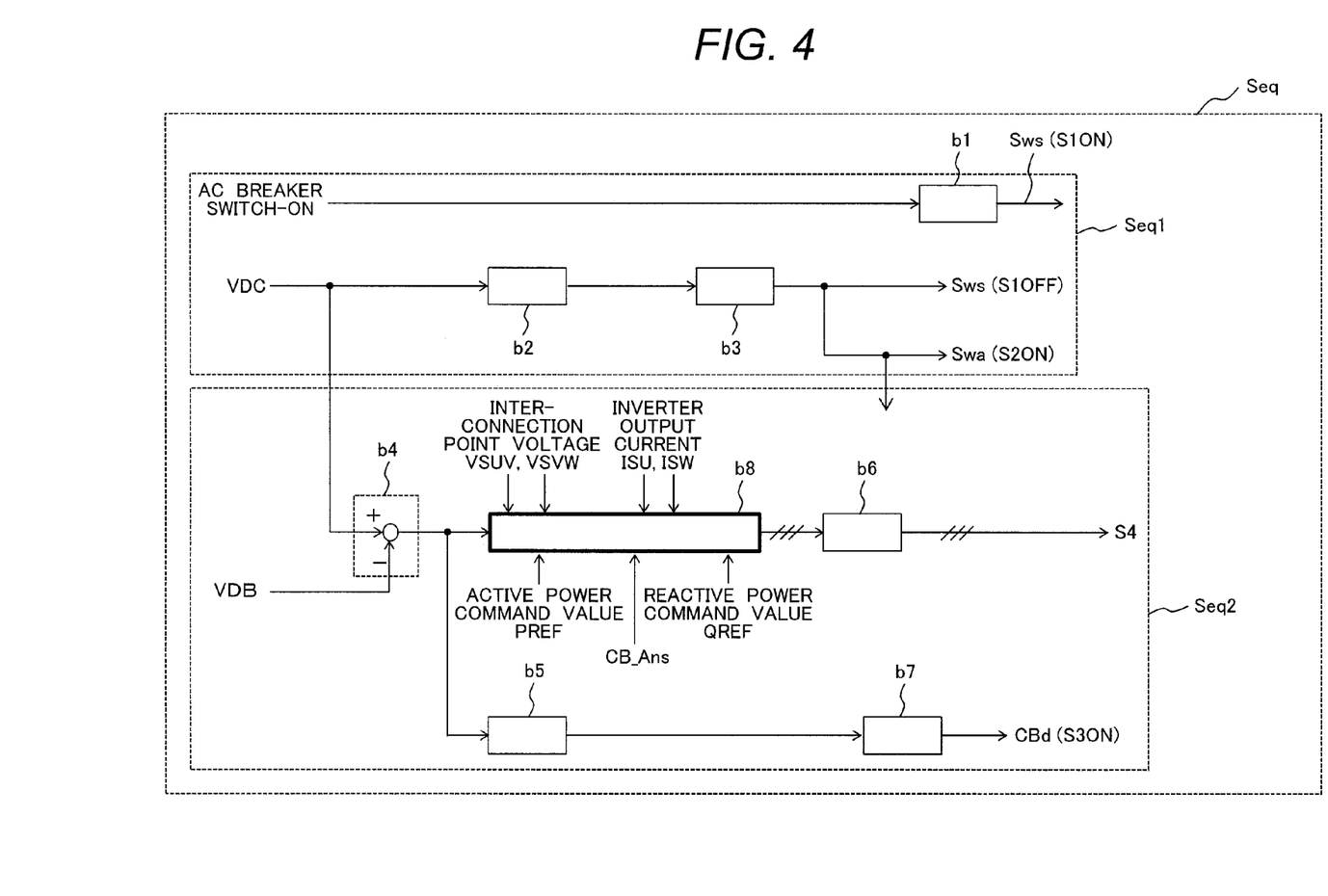
FIG. 4 is a diagram showing a configuration example of a sequence processing unit in a controller.

The controller C shown in FIG. 1 includes a sequence processing unit and a gate signal calculation unit inside in order to execute the control operation shown in FIG. 3. FIG. 4 is a diagram showing a configuration example of the sequence processing unit Seq of these two units. The function of the sequence processing unit Seq is performed by an initial charging calculation unit Seq1 that performs processing during a time period from the time t1 to the time t3 shown in FIG. 3 (an initial charging time period during which charging is performed via the initial charging resistor Rs), and by a charging calculation unit Seq2 that performs processing during a time period from the time t4 to the time t5 shown in FIG. 3 (a time period after the AC switch Swa is switched on.

In the initial charging calculation unit Seq1, the switch-on of the AC breaker is detected by an AC breaker switch-on detection unit b1 first, and then a switch-on signal S1ON of the initial charging switch Sws is output. In addition, the initial charging calculation unit Seq1 monitors the DC voltage VDC, and when the DC voltage VDC reaches the initial charging completion threshold voltage shown in FIG. 3, a DC voltage judgment unit b2 outputs a detection flag. A switching control signal calculation unit b3 issues a switch-off command S1OFF in response to the detection flag to switch off the initial charging switch Sws, and successively issues a switch-on command S2ON to the AC switch Swa.

In the charging calculation unit Seq2, after the switch-on command S2ON to the AC switch Swa is received, the inverter control is performed with the switch-on threshold voltage of the DC breaker CBd used as a target. In order for the voltage control to be performed, the DC voltage VDC across the DC capacitor CD and the storage battery voltage VDB are taken in by the initial charging calculation unit Seq1 on a steady basis, and the voltage difference between these voltages is calculated by a subtracter b4. The above-mentioned gate signal calculation unit includes a voltage command calculator b8 and a gate signal calculator b6. Although the concrete processing contents performed by this gate signal calculation unit will be explained later with reference to FIG. 5, to put it briefly, the gate signal S4 is given to the inverter INV in such a way that the DC voltage VDC may gradually increase to the storage battery voltage. Furthermore, the voltage command calculator b8 takes in the interconnection point voltages and the converter output currents in order to control the inverter INV.

In addition, the voltage difference between the DC voltage VDC of the DC capacitor CD and the storage battery voltage VDB is input into a voltage judgment unit b5, and the detection flag is output by the voltage judgement unit b5 in comparison with the switch-on threshold voltage of the DC breaker CBd when the DC voltage VDC reaches the switch-on threshold voltage. The breaker control signal calculation unit b7 issues a switch-on command S3ON to the DC breaker CBd in response to the detection flag in order to switch on the DC breaker CBd. In the operation of the sequence processing unit Seq hereinafter, the control by the inverter INV is performed so that the electric power system freely accommodates the power storage device with electric power and vice versa. In the above description, the initial charging means an operation in which the capacitor is charged with a current flowing through the initial charging resistor Rs.

Figure 5:
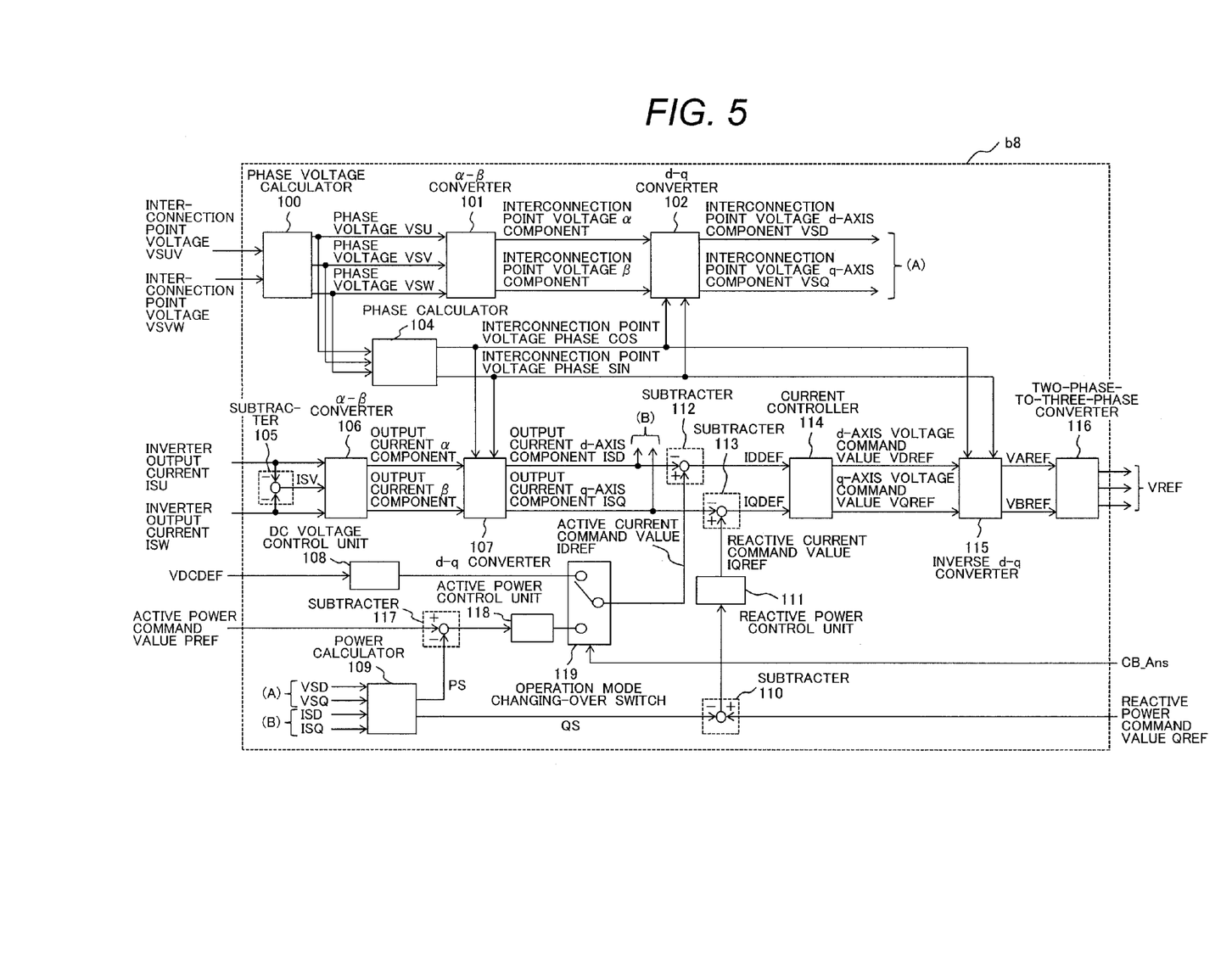
FIG. 5 is a diagram showing a configuration example of a gate signal calculation unit in the controller.

FIG. 5 shows an example of a typical gate signal calculation unit. Because this configuration is well-known in inverter control technology, the explanation regarding this configuration will be made briefly.

In FIG. 5, a reference numeral 100 denotes a phase voltage calculator, and the phase voltage calculator 100 calculates phase voltages (VSU, VSV, and VSW) from the line voltages (VSUV, VSVW) detected by the interconnection point voltage detectors PT shown in FIG. 1. The output of the phase voltage calculator 100 is input into an α-β converter 101 and phase calculator 104. The α-β converter 101 converts the phase voltages (VSU, VSV, and VSW) into an a component and a β component. The outputs of the α-β converter 101 are input into a d-q converter 102.

On the other hand, the phase calculator 104 calculates interconnection point voltage phases from the connection point phase voltages (VSU, VSV, and VSW). On the other hand, the outputs of the phase calculator 104 are input into the d-q converter 102, a d-q converter 107, and an inverse d-q converter 115. The d-q converter 102 takes in the interconnection point voltage α component, the interconnection point voltage β component, and the interconnection point voltage phases that are outputs from the phase calculator 104, and converts the interconnection point voltages into a d-axis component and a q-axis component. The outputs of the d-q converter 102 are input into a power calculator 109. Through the above processing, the main circuit voltages are converted from three-phase components into two-phase components, and then the two-phase components are converted into d-q axis components.

In FIG. 5, a reference numeral 105 denotes a subtracter, and the subtracter 105 takes in the converter output currents ISU and ISW from the inverter output current detector CTI shown in FIG. 1. The subtracter 105 also calculates a V phase current ISV by supposing that the zero phase component in the inverter output current is zero. Although an α-β converter 106 converts the main circuit currents from three-phase components into two-phase components, and then the d-q converter 107 converts the two-phase components into d-q axis components, explanations regarding these converters will be omitted.

In addition, the voltage difference VDCDEF between the DC voltage VDC across the DC capacitor CD and the storage battery voltage VDB shown in FIG. 4 is taken in for the processing in FIG. 5. ADC voltage control unit 108 takes in the difference between the storage battery voltage and the DC voltage, and outputs an active current command value IDREF. The output IDREF is input into a subtracter 112 via a changing-over switch to be described later.

Furthermore, the power calculator 109 receives the d-axis component and q-axis component of the interconnection point voltages and those of the output currents, and outputs an active power PS and a reactive power QS. The output active power PS of the power calculator 109 is input into a subtracter 117, and the output reactive power QS is input into a subtracter 110. On receiving a reactive power command value QREF and a reactive power QS from the power calculator 109, the subtracter 110 outputs a reactive power difference. On receiving the reactive power difference, a reactive power control unit 111 outputs a reactive current command value IQREF. The output IQREF is input into a subtracter 113.

On receiving the output current d-axis component and the active current command value, the subtracter 112 outputs a difference IDDEF. The output difference IDDEF is input into a current controller 114. Furthermore, on receiving the output current q-axis component and the reactive current command value IQREF, the subtracter 113 outputs a difference IQDEF. The output difference IQDEF is input into the current controller 114.

According to the control shown in FIG. 5, as described above, the current controller 114 obtains the difference IDDEF from the subtracter 112 and the difference IQDEF from the subtracter 113, calculates a d-axis voltage command value VDREF from the obtained difference IDDEF and a q-axis voltage command value VQREF from the obtained difference IQDEF, and outputs both d-axis voltage command value VDREF and q-axis voltage command value VQREF. The output command values are input into the inverse d-q converter 115. The inverse d-q converter 115 receives the voltage command value d-axis component VDREF, the voltage command value q-axis component VQREF, and the interconnection point voltage phases, and converts the voltage command value into an α component and a β component. Subsequently, a two-phase-to-three-phase converter 116 converts the voltage command value α component and the voltage command value β component into a three-phase voltage command value VREF. The output(VREF) from the two-phase-to-three-phase converter 116 is input into the inverter INV as agate signal S4 via the gate signal calculator b6 in FIG. 4.

Although the above description has been made about the control sequence to the time when the power storage device is interconnected, wherein the DC voltage control unit 108 calculates the active current command value IDREF, and performs output voltage control, an operation mode changing-over switch 119 is changed over in accordance with a DC breaker on-off state signal CB_Ans after the DC breaker CBd is switched on. At this time, an active power command value PREF transmitted from the upper level system and the output active power PS from the power calculator 109 are input into a subtracter 117, and the subtracter 117 outputs an active power difference. An active power control unit 118 receives the active power difference, and outputs the active current command value IDREF. In the case of the normal operation of the power converter 1, the active power control unit 118 calculates the active current command value IDREF, and performs output voltage control.

According to the first embodiment of the present invention that has been described so far, because the limited current is applied to the DC capacitor, the difference between the voltage of the capacitor and the voltage of the storage battery is monitored, and the power converter is connected to the power storage device on the basis of the monitored difference, a rush current, which could occur in the start process from the initial charge to the connection of the power storage device, can be prevented from occurring.

Second Embodiment

Figure 6:
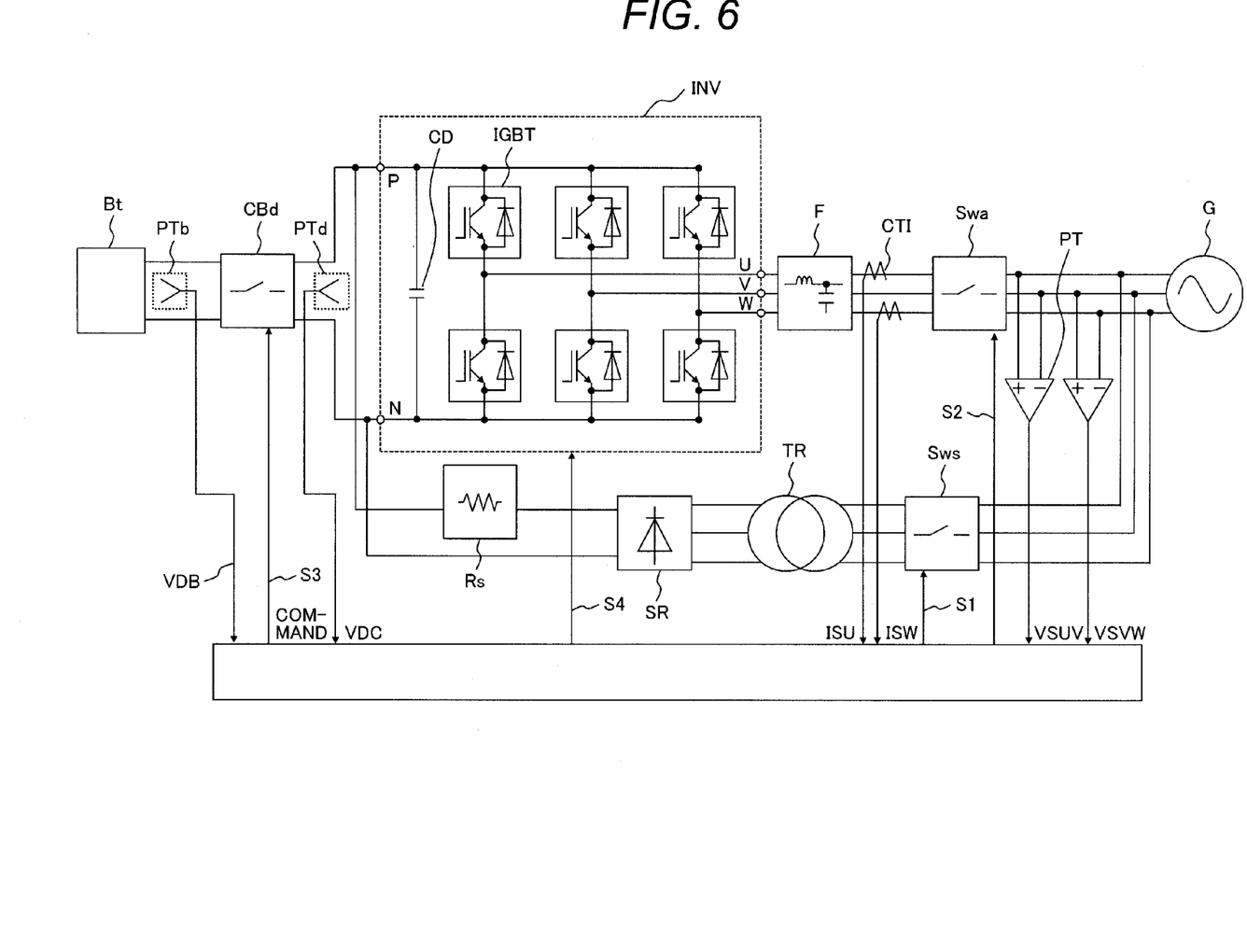
FIG. 6 is a diagram showing the outline configuration of a power converter according to a second embodiment of the present invention.

In the case of a second embodiment shown in FIG. 6, a start circuit is used for a main circuit configuration for applying a limited current to a capacitor. While the first embodiment includes the AC switch Swa and the series circuit of the initial charging resistor Rs and the initial charging switch Sws, wherein the series circuit is disposed parallel to the AC switch Swa, the start circuit is used in the second embodiment instead of this combination of the AC switch Swa, the initial charging resistor Rs and the initial charging switch Sws.

The start circuit is a series circuit formed between an electric power system G and a DC capacitor CD and a circuit route formed by this series circuit does not pass through an inverter. An AC switch Swa, a transformer TR, a rectifier SR, and an initial charging resistor Rs are disposed in the series circuit as the start circuit in this order from the electric power system G side. Because a start control technique in the case of the configuration of this second embodiment is the same as in the case of the configuration of the first embodiment, explanations thereof will be omitted.

According to the second embodiment of the present invention that has been described so far, because the limited current is applied to the capacitor, the difference between the voltage of the capacitor and the voltage of the storage battery is monitored, and the connection of the power storage device is performed on the basis of the monitored difference, a rush current, which could occur in the start process from the initial charge to the connection of the power storage device, can be prevented from occurring. In addition, there is such an advantage that the inverter can be started without introducing an over modulation by adjusting the turn ratio of the transformer TR. Particularly, in the case where there is an existing start circuit, the power converter according to this embodiment can be realized without installing new incidental facilities.

Third Embodiment

Figure 7:
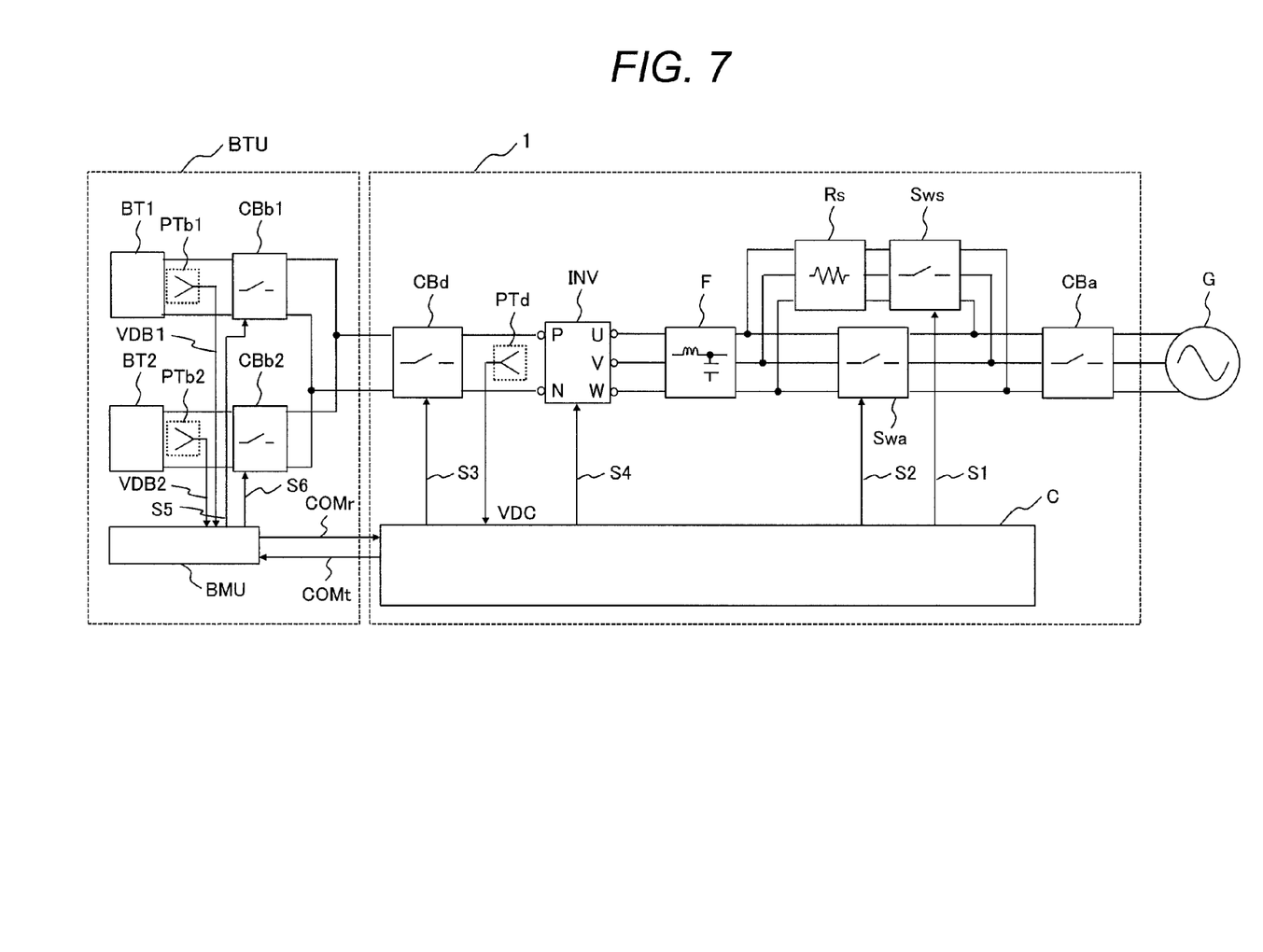
FIG. 7 is a diagram showing the outline configuration of a power converter according to a third embodiment of the present invention.

In the case of a third embodiment shown in FIG. 7, a power storage device Bt that is a target to which the present invention is applied comprises a battery unit BTU.

In an example shown in FIG. 7, two storage batteries BT1 and BT2 are used in the state of being connected to each other in parallel via battery breakers CBb1 and CBb2. Because there is a possibility that both individual operation of each storage battery and combined operation of the two storage batteries are required, the battery unit BTU is configured in such a way that the voltage of each storage battery can be detected. Battery voltage detectors PTb1 and PTb2 detect the terminal voltages of the storage batteries BT1 and BT2 respectively, and a battery management unit BMU monitors the terminal voltages. The detected voltages are transmitted to a controller C by the battery management unit BMU so as to be used for the start control or the like.

To put it concretely, as shown in FIG. 7, the battery unit BTU is an electric power storage system including the storage batteries BT1 and BT2, which are connected to each other in parallel, and the battery management unit BMU that is a controller. The storage batteries BT1 and BT2 include the battery voltage detectors PTb1 and PTb2, and the battery breakers CBb1 and CBb2 respectively. The battery voltage detectors PTb1 and PTb2 measure the voltages of the storage batteries BT1 and BT2 respectively, and output the measurement information to the battery management unit BMU. The battery breakers CBb1 and CBb2 are included in the storage batteries BT1 and BT2 respectively, and they are appropriately switched off when any emergency occurs or when the replacement of the storage batteries BT1 or BT2 is made. The battery management unit BMU takes in the measurement values, which are output from the battery voltage detector PTb1 and PTb2, and transmits these measurement values to the controller C of the power converter 1. The controller C receives and takes in the measurement values as received information COMr.

Figure 9:
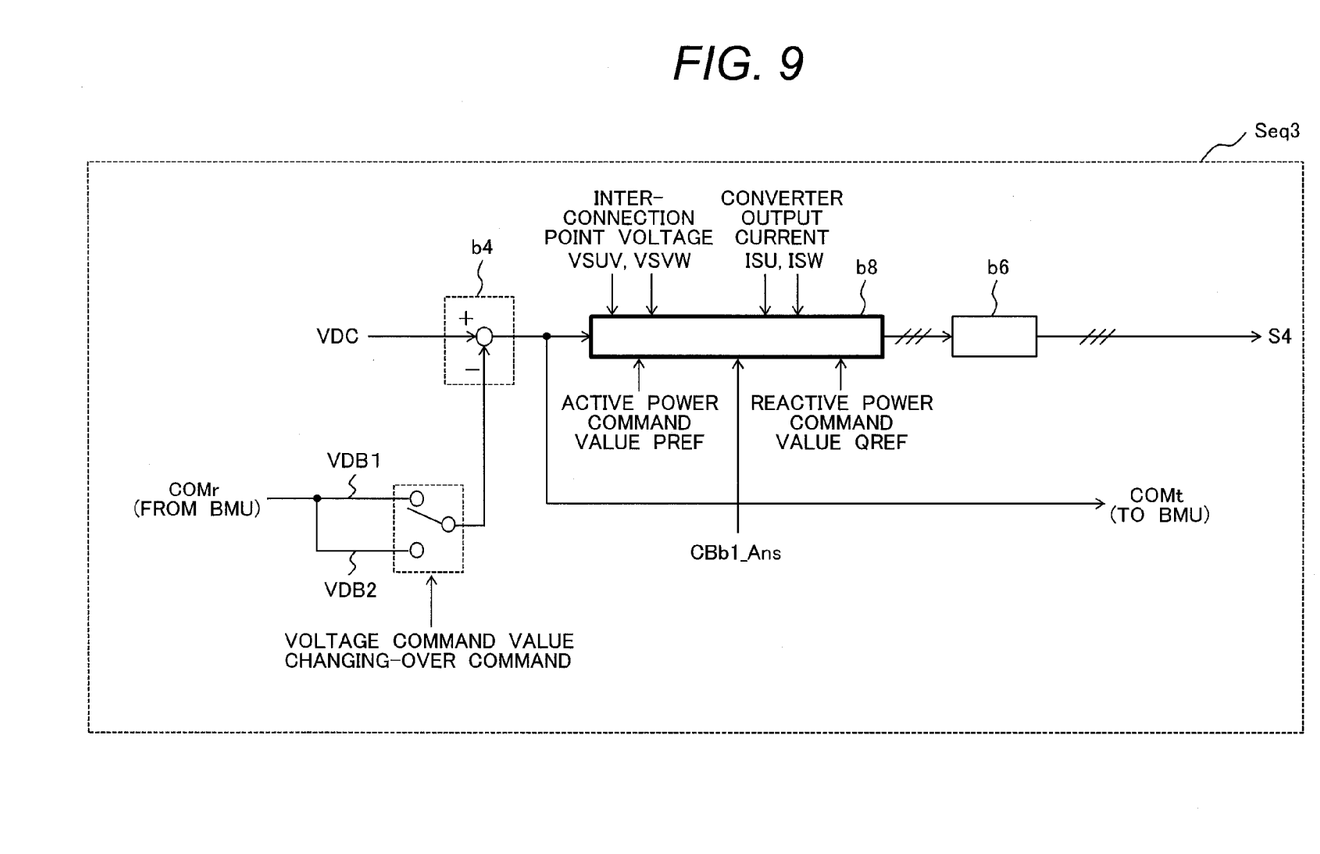
FIG. 9 is a diagram showing a configuration example of a sequence processing unit in a controller according to the third embodiment of the present invention.

The controller C according to the third embodiment has to perform start control even when the battery breaker CBb1 is off owing to the replacement of the storage batteries BT1, or BT2 or the like. In this case, because the voltage of the storage battery BT1 and that of the storage battery BT2 are different from each other, there is a possibility that an excessive current flows from the storage battery BT1 to the storage battery BT2 and an inverter when the battery breaker CBb1 is switched on, which may lead to damages to the storage batteries and the inverter. FIG. 9 is a diagram showing a configuration example of a sequence processing unit Seq 3 according to the third embodiment. The power converter 1 includes an operation interface means, using which manual operations can be performed, in a not-shown part of the power converter itself, and it is possible to select storage batteries to be interconnected to each other by using the interface means. When an operation to interconnect the storage battery BT1, if the storage battery BT1 is disconnected from the power converter 1, is made, the interface means transmits a voltage command value changing-over signal to the controller C. The controller C takes the voltage VDB1 of the storage battery BT1 as a voltage command value, and performs voltage control so that the voltage VDB1 may coincide with the DC voltage of the inverter. The difference between the voltage VDB1 of the storage battery BT1 and the DC voltage of the inverter is transmitted to the battery management unit BMU as transmission information COMt. Judging that the voltage difference is within a predefined range, the battery management unit BMU gives a switch command S5 to the breaker CBb1, which enables the breaker CBb1 to be switched on without generation of a large current.

After the breaker CBb1 is switched on, the on-off state signal CBb1_Ans of the breaker CBb1 is received via communication and input into an operation mode changing-over switch, which changes over the operation mode into inverter control in accordance with the calculation performed by an active power control unit as described in the first embodiment.

Figure 8:
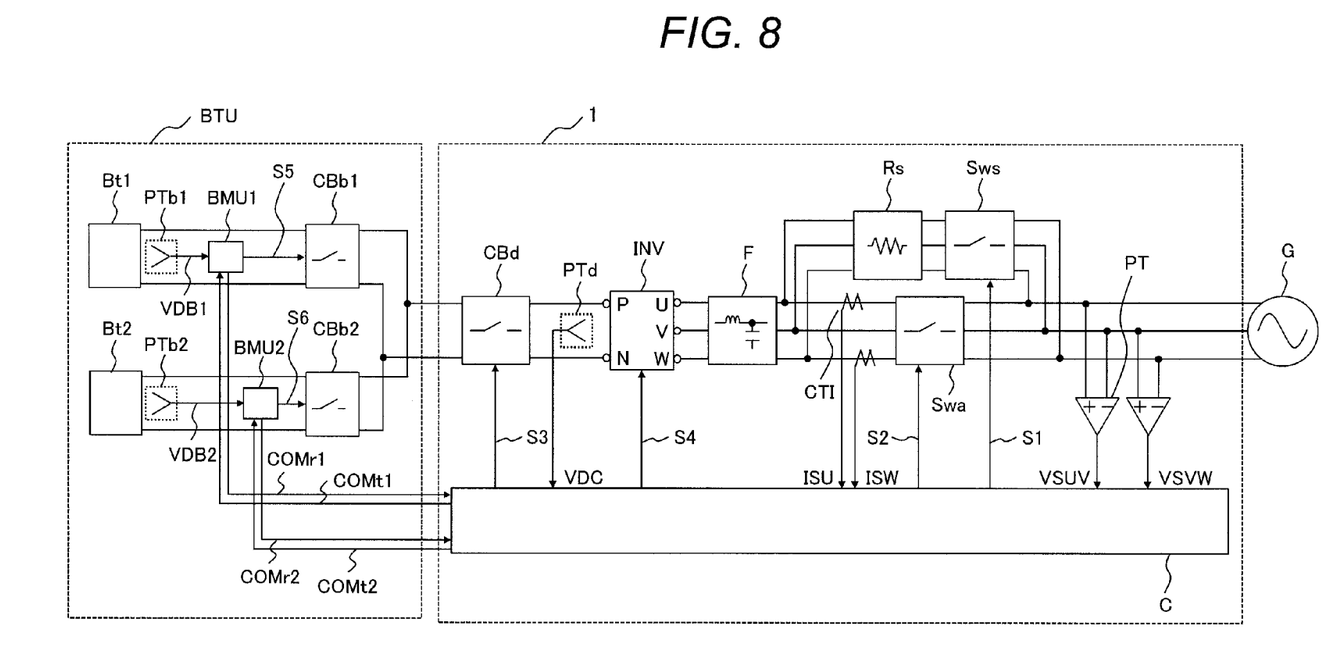
FIG. 8 is a diagram showing a modification example of the third embodiment shown in FIG. 7.

FIG. 8 shows an alternate embodiment example for the third embodiment shown in FIG. 7. Although the battery management unit BMU manages and controls all the storage batteries BT1 and BT2 in FIG. 7, battery management units BMU1 and BMU2 are installed for the storage batteries BT1 and BT2 respectively in the example shown in FIG. 8, and the storage batteries BT1 and BT2 are managed and controlled respectively by the battery management units BMU1 and BMU2.

According to the above described third embodiment of the present invention, because the limited current is applied to the capacitor, and because the difference between the voltage of the capacitor and the voltage of the storage battery is monitored and the connection of the power storage device is performed on the basis of the monitored difference, a rush current, which could occur in the start process from the initial charge and to the connection of the power storage device, can be prevented from occurring. Particularly, in the case where a storage battery is a large-sized facility, and parts of the storage battery have to be installed in a distributed fashion, the third embodiment of the present invention can be preferable.

What is claimed is:

1. A power converter that is installed between an electric power system and an energy storage device and performs AC/DC conversion with the use of an inverter, comprising:
   a harmonic filter in an AC circuit on the electric power system side; and
   a DC capacitor and a DC breaker in a DC circuit on the energy storage device side,
   wherein, when the energy storage device starts running, a current that is limited by a limiting resistor is given from the electric power system side to the DC capacitor, the difference between the voltage of the DC capacitor and the voltage of the energy storage device is monitored, and the power converter is connected to the energy storage device by switching on the DC breaker on the basis of the monitored difference,
   wherein the power converter further comprises:
   a first switch included in the AC circuit;
   a resistor, one terminal of which is connected to the first switch in series and the other terminal of which is connected to the AC terminal of the inverter via the harmonic filter; and
   a second switch that is connected in parallel to a series circuit of the first switch and the resistor,
   wherein a start control means for the power converter includes the steps of:
   switching on the first switch, opening the first switch when the voltage of the DC capacitor exceeds a first predefined value, and further switching on the second switch;
   controlling the inverter so that the difference between the voltage of the energy storage device and the voltage of the DC capacitor decreases by starting the switching of the inverter after the second switch is switched on;
   switching on the DC breaker if the difference between the voltage of the energy storage device and the voltage of the DC capacitor is within a predefined range;
   changing over an operation mode after the switch-on of the DC breaker; and controlling the inverter by using an active power command value after the operation mode is changed over.

2. The power converter according to claim 1, comprising:
a second switch installed in the AC circuit, the second switch being connected to the AC terminal of the inverter via the harmonic filter;
a third switch connected to the AC circuit in parallel;
a transformer connected to the AC circuit via the third switch; and
a rectifier whose AC terminal is connected to the transformer and whose DC output circuit is connected to a DC capacitor via a resistor,
wherein a start control means for the power converter includes the steps of:
switching on the third switch, and opening the third switch when the voltage of the DC capacitor exceeds a second predefined value;
controlling the inverter so that the difference between the voltage of the energy storage device and the voltage of the DC capacitor decreases by starting the switching of the inverter after the third switch is opened; and
switching on the DC breaker if the difference between the voltage of the energy storage device and the voltage of the DC capacitor is within a predefined range.

3. The power converter according to claim 2,
wherein the energy storage device includes a plurality of unit energy storage devices connected to each other in parallel,
each of the unit energy storage devices includes a DC switch and a storage battery connected to the DC switch,
the storage batteries of the unit energy storage devices are connected to each other in parallel via the DC switches, and
the power converter includes a means for detecting the storage battery voltages of the unit energy storage devices.

4. The power converter according to claim 3,
wherein the inverter is controlled to reduce the difference between the voltage of the storage battery at the time of the DC switch being open and the voltage of the DC capacitor of the inverter when the DC switch of at least one of the unit energy storage devices is shifted from an open state to a closed state.

5. The power converter according to claim 3, comprising:
an operation interface means to manually give an interconnection command to a unit energy storage device whose DC switch is in an open state; and
a switching means for changing over a voltage command on the basis of a signal from the interface means.

6. The power converter according to claim 1,
wherein the energy storage device includes a plurality of unit energy storage devices connected to each other in parallel,
each of the unit energy storage devices includes a DC switch and a storage battery connected to the DC switch,
the storage batteries of the unit energy storage devices are connected to each other in parallel via the DC switches, and
the power converter includes a means for detecting the storage battery voltages of the unit energy storage devices.

7. The power converter according to claim 6,
wherein the inverter is controlled to reduce the difference between the voltage of the storage battery at the time of the DC switch being open and the voltage of the DC capacitor of the inverter when the DC switch of at least one of the unit energy storage devices is shifted from an open state to a closed state.

8. The power converter according to claim 7, comprising:
an operation interface means to manually give an interconnection command to a unit energy storage device whose DC switch is in an open state; and
a switching means for changing over a voltage command on the basis of a signal from the interface means.

9. The power converter according to claim 6, comprising:
an operation interface means to manually give an interconnection command to a unit energy storage device whose DC switch is in an open state; and
a switching means for changing over a voltage command on the basis of a signal from the interface means.

10. The power converter according to claim 1,
wherein the energy storage device includes a plurality of unit energy storage devices connected to each other in parallel,
each of the unit energy storage devices includes a DC switch and a storage battery connected to the DC switch,
the storage batteries of the unit energy storage devices are connected to each other in parallel via the DC switches, and
the power converter includes a means for detecting the storage battery voltages of the unit energy storage devices.

11. The power converter according to claim 10,
wherein the inverter is controlled to reduce the difference between the voltage of the storage battery at the time of the DC switch being open and the voltage of the DC capacitor of the inverter when the DC switch of at least one of the unit energy storage devices is shifted from an open state to a closed state.

12. The power converter according to claim 11, comprising:
an operation interface means to manually give an interconnection command to a unit energy storage device whose DC switch is in an open state; and
a switching means for changing over a voltage command on the basis of a signal from the interface means.

13. The power converter according to claim 4, comprising:
an operation interface means to manually give an interconnection command to a unit energy storage device whose DC switch is in an open state; and
a switching means for changing over a voltage command on the basis of a signal from the interface means.

14. The power converter according to claim 10, comprising:
an operation interface means to manually give an interconnection command to a unit energy storage device whose DC switch is in an open state; and
a switching means for changing over a voltage command on the basis of a signal from the interface means.

* * * * *